United States Patent

[11] 3,600,562

| [72] | Inventors | Frank DiNicolantonio<br>Williamsville;<br>Voit C. Drankhan, Hamburg; Paul W.<br>Wagener, Depew, all of, N.Y. |
|---|---|---|
| [21] | Appl. No. | 886,697 |
| [22] | Filed | Dec. 19, 1969 |
| [45] | Patented | Aug. 17, 1971 |
| [73] | Assignee | Westinghouse Electric Corporation<br>Pittsburgh, Pa. |

[54] COMPUTER SYSTEM FOR DETERMINING THE STOP LENGTH REQUIRED TO ARREST A MOVING STRIP OF MATERIAL
5 Claims, 3 Drawing Figs.

[52] U.S. Cl. .................................................. 235/151.32,
   73/490
[51] Int. Cl. ...................................................... G06g 7/78
[50] Field of Search........................................... 235/151.32;
   324/68; 73/490, 491; 33/142

[56] References Cited
UNITED STATES PATENTS
2,340,403  2/1944  Morley et al................ 73/490 X
3,028,550  4/1962  Naydan et al................ 235/151.32 X
3,145,294  8/1964  Jackson........................ 235/151.32

*Primary Examiner*—Malcolm A. Morrison
*Assistant Examiner*—Edward J. Wise
*Attorneys*—F. H. Henson, R. G. Brodahl and J. J. Wood ABSTRACT: This disclosure relates to a computer for determining the length of material required in order to arrest a moving strip of material in a preselected deceleration time, the material being payed out from a reel in a mill operated at a predetermined mill speed. An analog signal, which is a function of the mill speed and deceleration time, is applied to a voltage comparator. Another input to the voltage comparator is a ramp signal. A train of pulses, synchronized with the ramp signal, is generated as a function of the payed out length of the strip material, the pulses being counted by a stop length counter. When the voltage comparator has inputs which are equal in magnitude, an inhibit signal is developed which is applied to inactivate the stop length counter, the cumulative counts of which will then be a function of the length of material required to stop the mill for the mill speed and deceleration time selected by the mill operator.

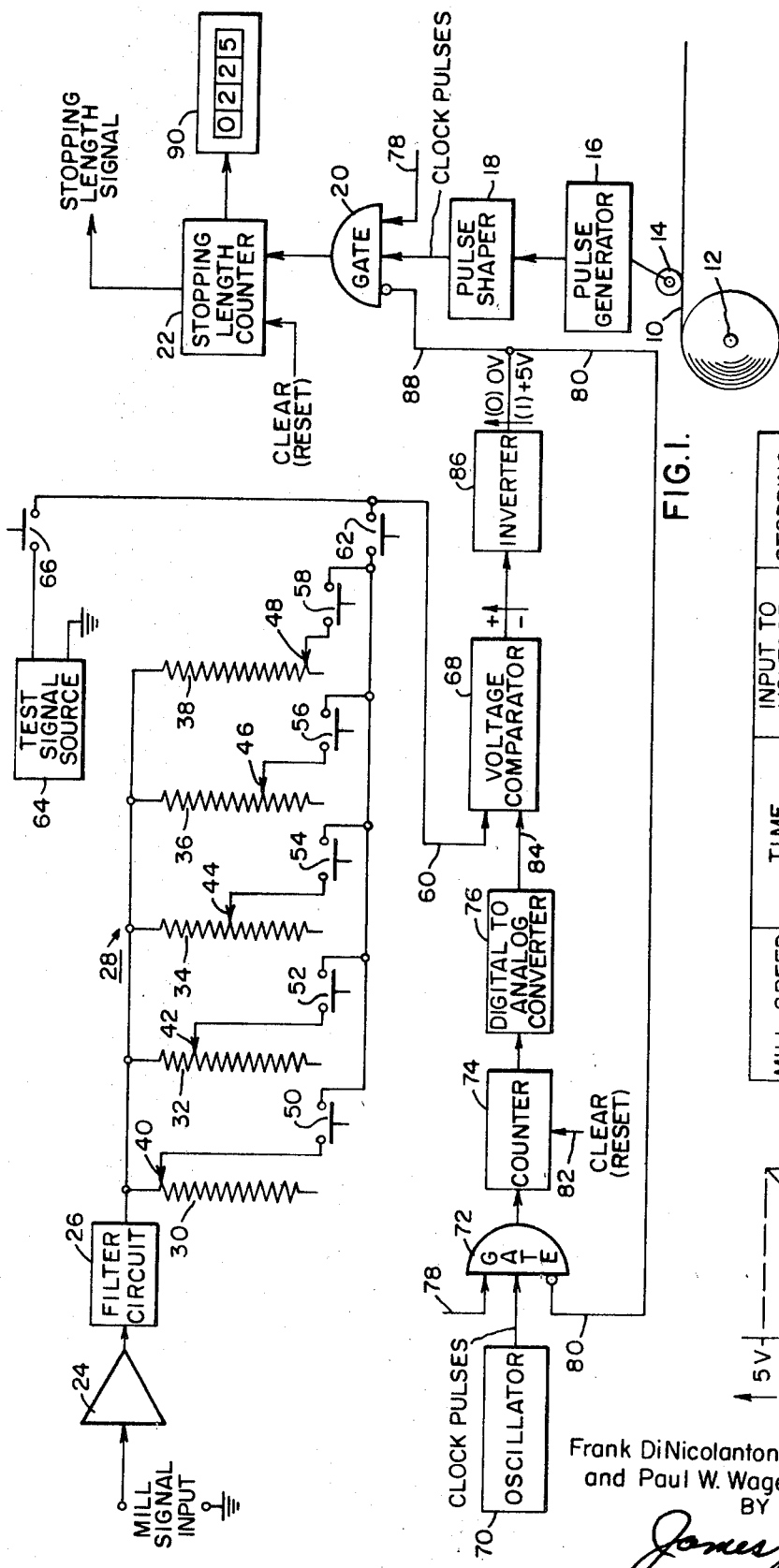
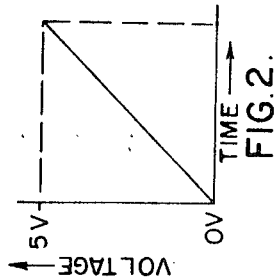

COMPUTER SYSTEM FOR DETERMINING THE STOP LENGTH REQUIRED TO ARREST A MOVING STRIP OF MATERIAL

CROSS REFERENCE TO RELATED APPLICATIONS

See the copending application for Digital To Analog Converter, Ser. No. 886,696, filed on Dec. 19, 1969, in the name of Paul W. Wagener and assigned to the same assignee as the instant invention.

Background of the Invention

1. Field of the Invention

This invention relates to a stopping length computer system for determining the length of payoff strip required to stop a rolling mill for the given mill speed and deceleration time selected by the operator.

2. Description of The Prior Art

In modern steel rolling mills, it is frequently necessary to determine the length of material required to stop a mill in a preselected deceleration time while running at a known speed. Before the arrival of automation, the mill operator made this determination empirically. Various solutions have been proposed in order to automate the decision-making process, most of these solutions making use of strictly analog techniques.

SUMMARY OF THE INVENTION

The invention relates to a computer system for determining the stop length required in order to arrest a moving strip of material in a predetermined deceleration time, the material being payed out from a reel in a mill operating at a selectable mill speed. Briefly, means provide an analog signal which is a function of both the mill speed and the deceleration time. Means are also provided to develop a ramp signal. Means, synchronized with the ramp signal means, generate a train of pulse signals which are a function of the payed out length of strip material. Means are further provided to compare the analog and ramp signals and to develop an inhibit signal when they are equal in magnitude. Finally, means are provided for counting the train of pulses and for receiving the inhibit signal, the receipt of the inhibit signal inactivating the counter means, the cumulative count up to the time of receipt of the inhibit signal being a function of the required stop length.

BRIEF DESCRIPTION OF THE DRAWINGS

For a better understanding of the invention, reference may be had to the exemplary embodiment shown in the accompanying drawings, in which:

FIG. 1 is an electromechanical schematic diagram showing the computer system in accordance with the invention;

FIG. 2 is a voltage vs. time waveform showing the ramp signal output of the digital to analog converter; and FIG. 3 is a tabular arrangement of typical system parameters and is used in explaining the operation of the invention.

DETAILED DESCRIPTION OF EXEMPLARY EMBODIMENT

The stopping length computer system of the instant invention is intended for utilization in connection with a payoff reel in a rolling mill. In view of the fact that the rolling mill art is fairly well-known, the description to follow will be directed in particular to those elements forming part of or cooperating more directly with the instant invention. Information concerning elements and/or mill functions not shown or described will be understood to be readily obtainable from commercially available sources or selectable from techniques well known to those practicing in the rolling mill art.

Referring now to FIGURE 1, a strip of material 10 is being payed off from a coil positioned on a mandrel 12. A suitable sensor such as a billy roll 14 is arranged in contiguous relationship with the strip 10, the roll 14 having a known circumference so that one revolution of the roll 14, means that a payed out length of strip 10 equal to the circumference of the roll has passed a datum position. The revolutions of the roller 14 are coupled to a pulse generator 16, which generates a number of pulses, perhaps 500 pulses for each revolution of the roll 14. The generated pulses are then applied to pulse shaper circuitry 18 which as the name implies, reshapes the generated pulses; the reshaped pulses result in a train of clock pulses which are applied through a gate means 20 to a stopping length counter 22.

An analog mill signal input, which is a function of the mill speed selected, (i.e. 5 volts= 1560 inches/sec.) is applied successively to an isolation amplifier 24, and to a filter circuit 26. Beyond the filter circuit 26, the signal is fed to an attenuation network, indicated generally at 28, which enables selection of the deceleration time. The attenuation network 28 is here simplified and is depicted as a number of rheostats: 30, 32, 34, 36 and 38, having wipers: 40, 42, 44, 46 and 48 respectively, with normally open cooperating contact pairs at 50, 52, 54, 56 and 58, respectively. As will be observed from a study of FIG. 1, the open contact pairs are arranged with one contact of the pair being connected to the associated wiper, and the other contact of the pair being connected to the common input line identified at 60. The closing of the contact pairs produces the following deceleration times:

50–90 secs.
        52–60 secs.
        54–45 secs.
        56–30 secs.
        58–20 secs.

The input line 60 also includes a serially arrayed, normally open contact pair at 62. A test signal generator source indicated at 64, includes normally open contact pair 66 connected to the input line 60 as indicated. The input line 60 is applied to a voltage comparator means indicated generally at 68.

A free running oscillator is identified at 70. A train of pulses from the oscillator 70 are applied to gate means 72, and through the gate means 72 the pulses are applied to a counter means indicated generally at 74. The digital output of the counter 74 is applied to a digital to analog converter means identified generally at 76. The gate means 72 includes an enable signal input 78 and an inhibit signal input at 80. The counter 74 includes a clear (reset) line at 82. One type of suitable digital to analog converter 76 is identified in the copending application for Digital To Analog Converter, Serial No. 886,696 filed on Dec. 19, 1969 in the name of Paul W. Wagener and assigned to the same assignee as the instant invention. Although the digital to analog converter is described and claimed in a separate application, the use of the digital to analog converter described in the copending application cited supra is not mandatory, and therefore for purposes of this disclosure any other digital to analog converter could also be used.

The output of the digital to analog converter 76 is applied to the voltage comparator 68 at 84. The output of the voltage comparator 68 is applied to an inverter indicated at 86, and the output of the inverter is applied as inhibiting signals to the gate means 20 at an inhibit signal input 88, and to the gate means 72 at inhibit signal input 80 as previously identified. A display device for the stopping length counter 22 is identified at 90.

Operation of The Exemplary Embodiment

Before using the computer system, the test input signal source at 64 may be used for purposes of determining whether the computer is in good calibration. In one embodiment, the application of test signal 64, by closing contact switch 66, resulted in a thousand counts on the counter 74 and the counter 22. If this result obtains, within a predetermined degree of accuracy, this indicates that the computer system is sufficiently accurate to be relied upon for the day's operation. Contact pair 62 would then be closed and 66 opened.

At various times during the working day, the mill operator is required to change the mill speed and/or deceleration time, this may be because a slowdown or a speed-up is necessitated by what is taking place elsewhere in the mill. The mill usually has some maximum speed dictated by various parameters, and this is equated to an analog voltage. For example, assume that 5 volts is equated to a maximum mill speed of 1560 inches per second. This voltage is applied to the isolation amplifier 24 and to a filter circuit 26. The mill operator, before attempting to use the stopping length calculator, makes a determination as to how fast he would like to stop the mill. This determination is effected by the rheostat arrangement of the attenuation network 28, and is accomplished by the turning of manual dials which cause the selected contact pair to close such as: 50 or 52 or 54 or 56 or 58. Having determined the time in which the mill is to be stopped, the appropriate contacts are then closed. Assume for example, that the mill is running at maximum speed, of 1560 inches per sec., and that the contacts 50 are closed to realize a deceleration time of 90 seconds. This means that there is no attenuation of the mill signal input and the voltage comparator means 68 now sees +5 volts.

The free running oscillator generates and sends a train of pulses through the gate 72. At the time of the closing of the contact pair 50, the gate means 72 and 20 are enabled by a signal on enabling input line 78. The billy roll 14 running along the moving strip, develops a train of clock pulses which are applied through the gate means 20 and the stopping length counter 22 begins to count upward. At the same time, the clock pulses passed by the gate means 72 are applied to the counter 74, and it begins to count upward. The counts of the counter 74, applied to the digital to analog converter 76, are developed as an increasing analog or ramp signal on the input line 84, in small incremental steps of perhaps 5 millivolts per increment. The ramp voltage signal builds up toward the 5 volts applied to line 60. During the interim or buildup period, the output of the voltage comparator is a binary ZERO, and the output of the inverter 86 is a binary ONE which, in the present embodiment, is a potential of +5 volts. The +5 volts are applied through inhibit input lines 80 and 88 to the respective gates 72 and 20, enabling the gates to pass pulses to the respective counters 74 and 22. The counters then are counting up in synchronization. Finally, the potential on the line 84 is equal to +5 volts, and when it goes slightly beyond this magnitude, the voltage comparator experiences a change in output, and in this particular embodiment goes from a ZERO to some slight positive voltage in the order of +3.2 volts. This then is changed by the inverter to a binary ZERO which is substantially equal to 0 volts. Zero volts on the lines 80 and 88 acts as an inhibitor signal to the gates 72 and 20 respectively, and the gates are now blocked - no further pulses reach the counters 74 and 22. We have thus measured with the billy roll 14 the length of strip that is required for the voltage to build up from 0 volts to 5 volts. In the illustrated example just described, this would be a stopping length equal to 900 feet with 1 volt input to the voltage comparator 68 equal to 180 feet (FIG. 3 Case A). The stopping length display means 90 then indicates the number of feet (i.e. 900) required to stop the mill in 90 seconds at a velocity of 5 volts=1560 inches per second. The number of counts counted by the stopping length counter 22 may be applied to the display device 90 which will equate the pulse count into a corresponding linear representation for display on the device 90, or the digitized output may be derived from the counter 22 for direct application elsewhere as a stopping length (S.L.) signal.

The system also has applicability for determining other slowdown requirements. For example, as shown in tabular form in FIG. 3, if it should be desired to slow down in 45 seconds, the mill operator would reset counters 22, 74 and then manually close the contact pair 54 by means of a manual dial setting. An enabling signal is then applied to gates 72 and 20 at 78. The same procedure would then take place, and counter 22 would build up a number of counts until the digital to analog converter 76 built up a voltage equal to the attenuated voltage dialed into the attenuation network 28 by the mill operator. As shown in FIG. 3, at the same mill speed, deceleration in 45 secs. would require 450 feet (Case C), while at half mill speed only 225 feet would be required (Case D).

It will therefore be apparent that there has been disclosed a computer system for calculating stopping lengths in a mill operating over wide ranges of both mill speed and deceleration time requirements.

What we claim is:

1. Computer system for determining the stop length required to arrest a moving strip of material in a predetermined deceleration time, the material being payed out from a reel in a mill operating at a selectable mill speed, comprising:
   a. means for providing an analog signal which is a function of said mill speed and said deceleration time;
   b. means for providing a ramp signal;
   c. means, synchronized in time with said ramp signal means, for generating a train of pulse signals as a function of the payed out length of said strip material;
   d. means for comparing said analog and ramp signals and developing an inhibit signal when the analog and ramp signals are equal in magnitude; and
   e. means for counting said train of pulse signals, adapted to receive said inhibit signal to stop further counting, the number of pulses counted up to the time of receipt of said inhibit signal being a function of the required stop length.

2. Computer system for determining the stop length required to arrest a moving strip of material in a predetermined deceleration time, the material being payed out from a reel in a mill operating at a selectable mill speed, comprising:
   a. means for providing an electrical signal which is a function of said mill speed;
   b. means adapted to receive said electrical signal and provide an analog signal which is a function of both said mill speed and said deceleration time;
   c. means for providing a ramp signal;
   d. means, synchronized in time with said ramp signal means, for generating a train of pulse signals as a function of the payed out length of said strip material;
   e. means for comparing said analog and ramp signals and developing an inhibit signal when the analog and ramp signals are equal in magnitude; and
   means for counting said train of pulse signals, adapted to receive said inhibit signal to stop further counting, the number of pulses counted up to the time of receipt of said inhibit signal being a function of the required stop length.

3. Computer system for determining the stop length required to arrest a moving strip of material in a predetermined deceleration time, the material being payed out from a reel in a mill operating at a selectable mill speed, comprising:
   a. means for providing an analog signal which is a function of said mill speed and said deceleration time;
   b. means for generating a first train of pulse signals;
   c. means for receiving said first train of pulse signals for converting said first train of pulse signals to a ramp signal;
   d. means, synchronized in time with said ramp signal means, for generating a second train of pulse signals as a function of the payed out length of said strip material;
   e. means for comparing said analog and ramp signals and developing an inhibit signal when the analog and ramp signals are equal in magnitude; and
   f. means for counting said second train of pulse signals, adapted to receive said inhibit signal to stop further counting, the number of pulses counted up to the time of receipt of said inhibit signal being a function of the required stop length.

4. Computer system for determining the stop length required to arrest a moving strip of material in a predetermined deceleration time, the material being payed out from a reel in a mill operating at a selectable mill speed, comprising:
   a. means for providing an analog signal which is a function of said mill speed and said deceleration time;
   b. means for providing a ramp signal;

c. means for generating a train of pulse signals as a function of the payed out length of said moving strip;
d. means for comparing said analog and ramp signals and developing an inhibit signal when the analog and ramp signals are equal in magnitude; and
e. means for counting said train of pulse signals;
f. means for gating, adapted to receive said inhibit signal and said train of pulse signals, interposed between said generating means and said counting means, the gating means delivering said train of pulse signals to said counting means in time synchronization with said ramp signal means, the gating means being disabled by the receipt of said inhibit signal, whereby the number of pulses counted by the counting means up to the time said gating means is disabled, is a function of the required stop length.

5. Computer system for determining the stop length required to arrest a moving strip of material in a predetermined deceleration time, the material being payed out from a reel in a mill operated at a selectable mill speed, comprising:
a. means for providing an electrical signal which is a function of said mill speed;
b. means adapted to receive said electrical signal and modify it to provide an analog signal which is a function of both said mill speed and said deceleration time;
c. means for generating a first train of pulse signals;
d. means for receiving said first train of pulse signals for conversion to a ramp signal;
e. means, synchronized in time with said ramp signal means, for generating a second train of pulse signals as a function of the payed out length of said strip material;
f. means for comparing said analog and ramp signals and developing an inhibit signal when the analog and ramp signals are equal in magnitude;
g. means for counting said second train of pulse signals;
h. means for gating, adapted to receive said inhibit signal and said second train of pulse signals, said gating means being interposed between said second train pulse generating means and said counting means, the gating means delivering said train of pulse signals to said counting means in time synchronization with said ramp signal means, the gating means being disabled by the receipt of said inhibit signal; whereby the number of pulses counted by the counting means, up to the time said gating means is disabled, is a function of the required stopping length.